(12) United States Patent
Huang

(10) Patent No.: US 10,415,518 B2
(45) Date of Patent: Sep. 17, 2019

(54) SUPERCHARGER STRUCTURE FOR AN ALL TERRAIN VEHICLE OR A UTILITY VEHICLE

(71) Applicant: Chien-Hsiang Huang, Tai-Pao (TW)

(72) Inventor: Chien-Hsiang Huang, Tai-Pao (TW)

( * ) Notice: Subject to any disclaimer, the term of this patent is extended or adjusted under 35 U.S.C. 154(b) by 69 days.

(21) Appl. No.: 15/857,790

(22) Filed: Dec. 29, 2017

(65) Prior Publication Data

US 2019/0203678 A1 Jul. 4, 2019

(51) Int. Cl.
| | | |
|---|---|---|
| *F02M 35/10* | (2006.01) | |
| *F02M 35/104* | (2006.01) | |
| *F02M 35/16* | (2006.01) | |
| *F02B 33/44* | (2006.01) | |

(52) U.S. Cl.
CPC ..... *F02M 35/10157* (2013.01); *F02B 33/446* (2013.01); *F02M 35/104* (2013.01); *F02M 35/10144* (2013.01); *F02M 35/10177* (2013.01); *F02M 35/10216* (2013.01); *F02M 35/10255* (2013.01); *F02M 35/162* (2013.01); *F02M 35/10262* (2013.01)

(58) Field of Classification Search
CPC ....... F02M 35/10157; F02M 35/10255; F02M 35/162; F02M 35/104; F02M 35/10216; F02M 35/10177; F02M 35/10144; F02M 35/10262; F02B 33/446
See application file for complete search history.

(56) References Cited

U.S. PATENT DOCUMENTS

| | | | | |
|---|---|---|---|---|
| 2,464,047 A | * | 3/1949 | Larkin | F02M 1/00 123/549 |
| 3,327,693 A | * | 6/1967 | Lundquist | F02B 33/00 123/197.4 |
| 3,365,878 A | * | 1/1968 | Powell | F02D 9/00 60/603 |
| 3,386,427 A | * | 6/1968 | Powell | F02D 9/00 123/459 |
| 3,549,132 A | * | 12/1970 | Haase | F02M 1/00 261/23.2 |
| 2016/0258396 A1 | * | 9/2016 | Nishimura | F02M 37/0064 |
| 2017/0248103 A1 | * | 8/2017 | Nishidono | F02M 35/116 |

* cited by examiner

*Primary Examiner* — Joseph J Dallo
(74) *Attorney, Agent, or Firm* — Alan D. Kamrath; Mayer & Williams PC

(57) ABSTRACT

A supercharger structure for an all terrain vehicle or a utility vehicle includes an engine body and a supercharging device. The engine body includes a cylinder having an intake passage and an outtake passage. The supercharging device includes a supercharger, a throttle, an intake manifold, and at least one nozzle. The supercharger includes a chamber having an inlet coupled with the throttle and an outlet connected to the intake manifold. The intake manifold and the at least one nozzle intercommunicate with the intake passage. The at least one nozzle is connected to a fuel supply pipe of a vehicle. External air is drawn in by a guiding device in the chamber, flows through the throttle and the inlet into the chamber, and is pressurized. The pressurized air flows through the intake manifold to mix with fuel ejected by the at least one nozzle and then enters the cylinder.

6 Claims, 4 Drawing Sheets

SUPERCHARGER STRUCTURE FOR AN ALL TERRAIN VEHICLE OR A UTILITY VEHICLE

BACKGROUND OF THE INVENTION

The present invention relates to a supercharger structure for an all terrain vehicle or a utility vehicle and, more particularly, to a supercharger structure for increasing the output of an engine.

All terrain vehicles (ATV) or utility vehicles (UTV) are transportation tools for people doing leisure activities and provide excellent chassis suspension systems for travelling over rough terrains.

All terrain vehicles (ATV) or utility vehicles (UTV) generally use the power of an engine which includes cylinders, pistons, a crankshaft, valves, etc. Air and gasoline are introduced into the cylinders and are combusted to push pistons for generating mechanical energy, and the waste gas is discharged. Thus, the engine has a horse power and a torque corresponding to the displacement of the engine.

However, the volume of an all terrain vehicle or a utility vehicle is smaller than an ordinary car and uses an engine with a smaller displacement, such that the output performances cannot fulfill the needs of users having higher demands in performances.

BRIEF SUMMARY OF THE INVENTION

An objective of the present invention is to provide a supercharger structure for increasing the engine output performance of an all terrain vehicle or a utility vehicle.

A supercharger structure for an all terrain vehicle or a utility vehicle according to the present invention includes an engine body and a supercharging device. The engine body includes a cylinder having an intake passage and an outtake passage. The supercharging device includes a supercharger, a throttle, an intake manifold, and at least one nozzle. The supercharger includes a chamber having an inlet and an outlet. The inlet is coupled with the throttle. The chamber is configured to receive a guiding device operably connected to the engine body. The outlet is connected to the intake manifold. The intake manifold and the at least one nozzle intercommunicate with the intake passage of the cylinder. The at least one nozzle is adapted to be connected to a fuel supply pipe of a vehicle. External air is drawn in by the guiding device actuated by operation of the engine body, flows through the throttle and the inlet into the chamber, and is pressurized. The pressurized air flows through the intake manifold to mix with fuel ejected by the at least one nozzle and then enters the cylinder.

In an example, the supercharging device further includes an air accumulator mounted between the cylinder and the supercharger. The air accumulator includes an air chamber having an input side and an output side. The input side of the air chamber intercommunicates with the outlet of the supercharger. The output side of the air chamber intercommunicates with the air intake manifold and the intake passage of the cylinder.

In an example, the supercharging device further includes an air accumulator and a control valve. The supercharger includes a duct at the inlet. The duct is connected to the air accumulator. The control valve is mounted to the duct. The air accumulator is mounted between the cylinder and the supercharger. The air accumulator includes an air chamber having an input side and an output side. The input side of the air chamber intercommunicates with the outlet and the duct of the supercharger. The output side of the air chamber intercommunicates with the air intake manifold and the intake passage of the cylinder.

In an example, the at least one nozzle includes two nozzles, and the two nozzles eject fuel into the cylinder simultaneously.

When fuel is added, the control valve is closed, and the external air passes through the throttle and the inlet into the chamber and is pressurized. The pressurized air passes through the air accumulator into the intake manifold to mix with fuel ejected by the two nozzles and then enters the cylinder. The air accumulator provides accumulation of pressure and buffering between the supercharger and the cylinder. Thus, air can be controlled to enter the intake manifold and the cylinder. The waste gas after combustion in the cylinder can be discharged through the outtake passage. The two nozzles can eject a greater amount of fuel in response to the pressurized air to increase the engine output efficiency.

During fuel return or idling of the engine, the throttle can be adjusted to allow a small amount of external air to enter the supercharger. In this case, the supercharger creates a negative pressure, and the control valve is opened. Furthermore, the duct forms a bypass passage communicating the inlet of the supercharger, the air accumulator, and the outlet of the supercharger. The pressure of the inlet and the outlet of the supercharger can be balanced. During fuel return or idling of the engine, the supercharger can operate in a force-saving manner while preventing adversely affecting the engine performances. Furthermore, the air can be guided from the air accumulator into the intake manifold and the cylinder while permitting the air accumulator to accumulate pressure for the purposes of returning fuel or idling. When fuel is added again, the control valve is closed, the throttle valve is opened to provide a larger opening, and the pressure in the air accumulator can be rapidly introduced into the cylinder to improve the accelerating effect.

The present invention will become clearer in light of the following detailed description of illustrative embodiments of this invention described in connection with the drawings.

DETAILED DESCRIPTION OF THE INVENTION

Figure 1:
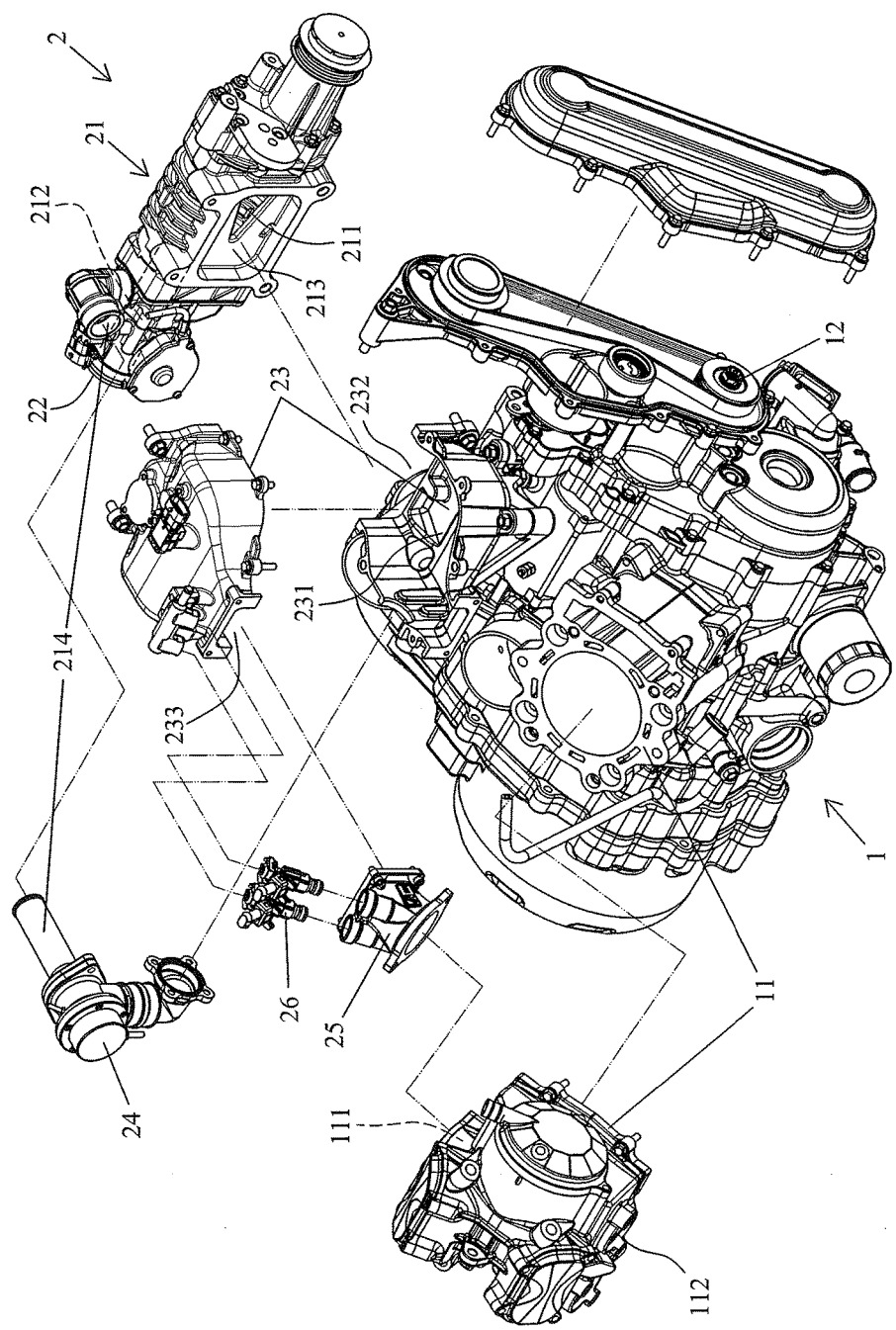
FIG. 1 is a partially exploded, perspective view of a supercharger structure according to the present invention.
Figure 2:
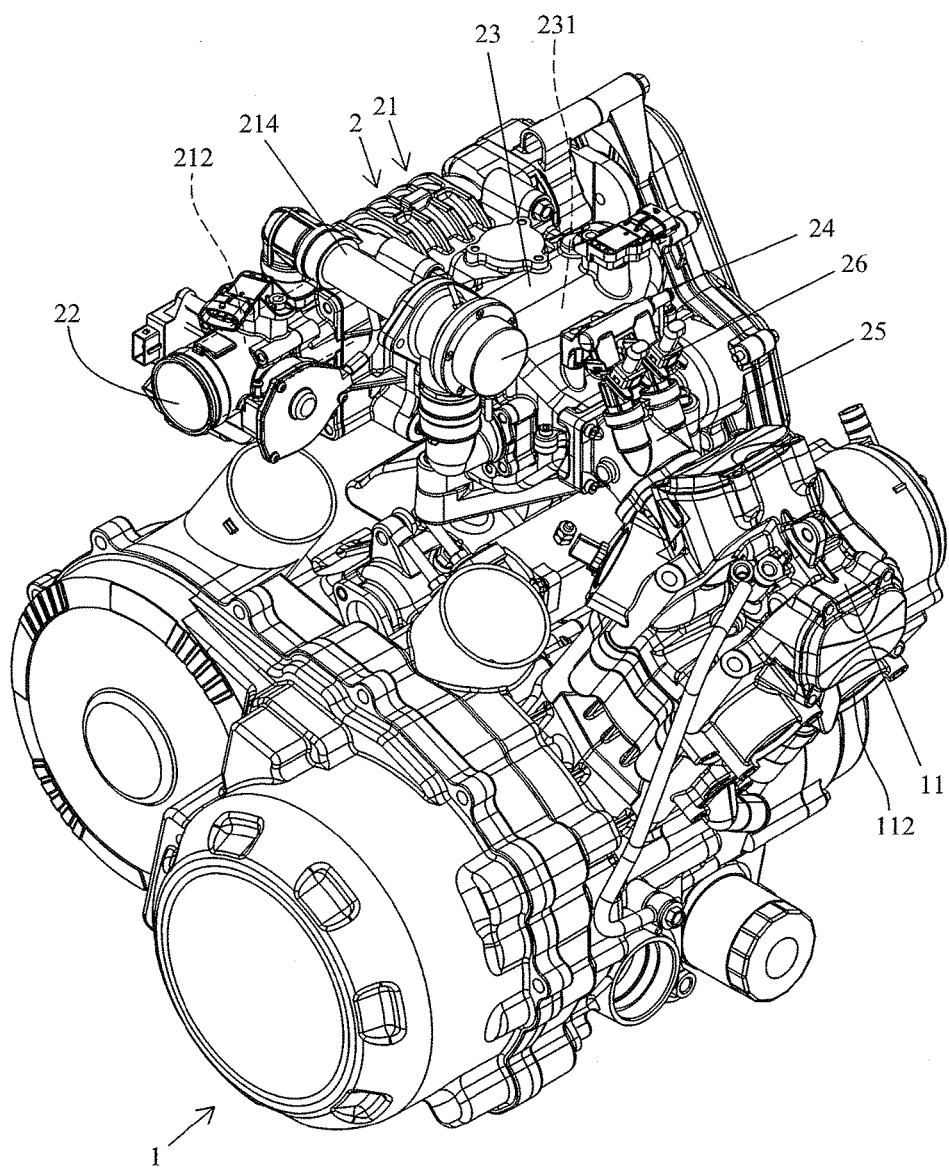
FIG. 2 is a perspective view of the supercharger structure of FIG. 1.

With reference to FIGS. 1 and 2, a supercharger structure for an all terrain vehicle or a utility vehicle includes an engine body 1 and a supercharging device 2. The engine body 1 includes a cylinder 11 and a crankshaft 12. The cylinder 11 has an intake passage 111 and an outtake passage 112. An intake valve (not shown) is mounted to the intake passage 111. An outtake valve (not shown) is mounted to the outtake passage 112. A piston (not shown) is mounted in the cylinder 11 and is operably connected to the crankshaft 12, such that the cylinder 11 provides a space for combustion and for intake, compression, explosion, and exhaust strokes. Reciprocating movement of the piston causes rotational movement of the crankshaft 12.

The supercharging device 2 includes a supercharger 21, a throttle 22, an air accumulator 23, a control valve 24, an intake manifold 25, and two nozzles 26. The supercharger 21 includes a chamber 211. The chamber 211 has an inlet 212 and an outlet 213. The inlet 212 is coupled with the throttle 22. The outlet 213 is connected to the intake manifold 25. The intake manifold 25 and the two nozzles 26 intercommunicate with the intake passage 111 of the cylinder 11. The supercharger 21 further includes a duct 214 at the inlet 212. The duct 214 is connected to the air accumulator 23. The control valve 24 is mounted to the duct 214 and can be a vacuum valve. The chamber 211 is configured to receive an impeller or other guiding device (not shown) operably connected to the crankshaft 12 of the engine body 1. Operation of the engine body 1 actuates the impeller or other guiding device to draw external air to flow through the throttle 22 and the inlet 212 into the chamber 211.

The air accumulator 23 is mounted between the cylinder 11 and the supercharger 21. The air accumulator 23 includes an air chamber 231 having an input side 232 and an output side 233. The input side 232 of the air chamber 231 intercommunicates with the outlet 213 of the supercharger 21 and the duct 214. The output side 233 of the air chamber 231 intercommunicates with the air intake manifold 25 and the intake passage 111 of the cylinder 11. The nozzles 26 are adapted to be connected to a fuel supply pipe of a vehicle. The air in the air chamber 231 can mix with fuel and then be guided into the cylinder 11.

Figure 3:
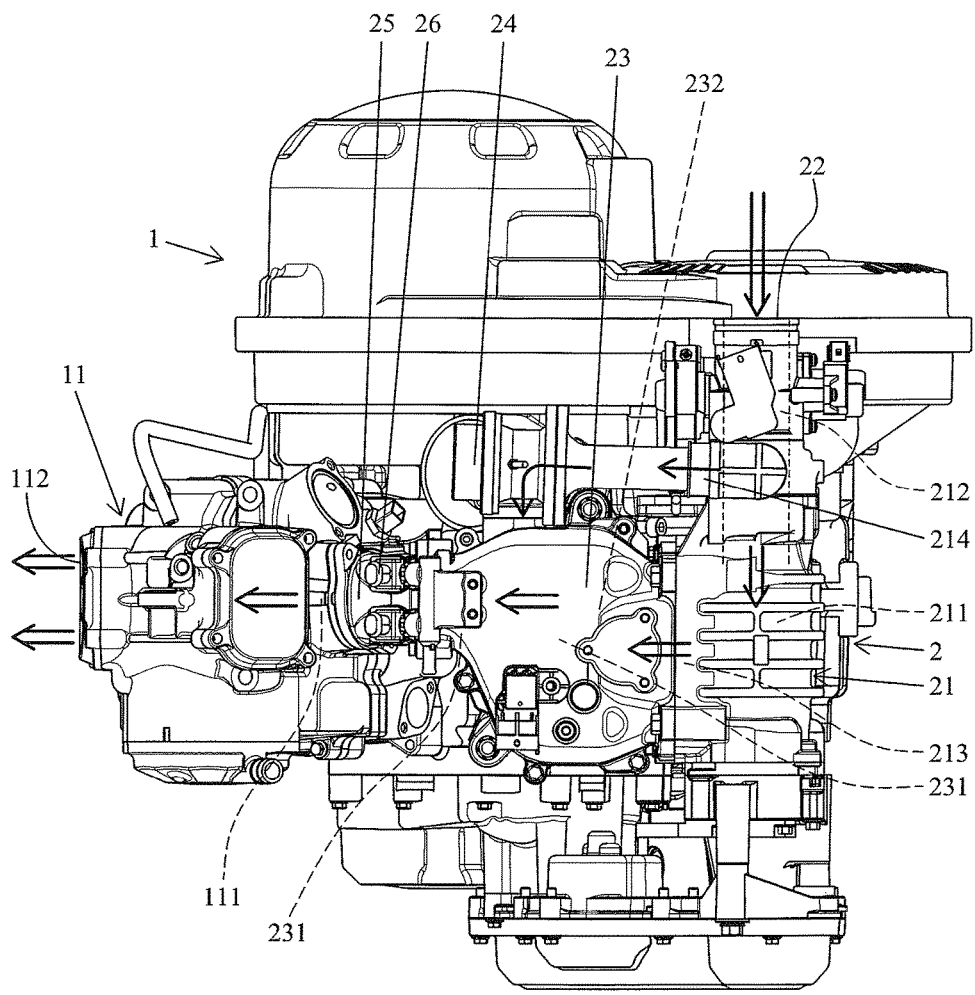
FIG. 3 is a diagrammatic top view illustrating the direction of supercharged intake and the return fuel or idle intake of the supercharger structure of FIG. 1.
Figure 4:
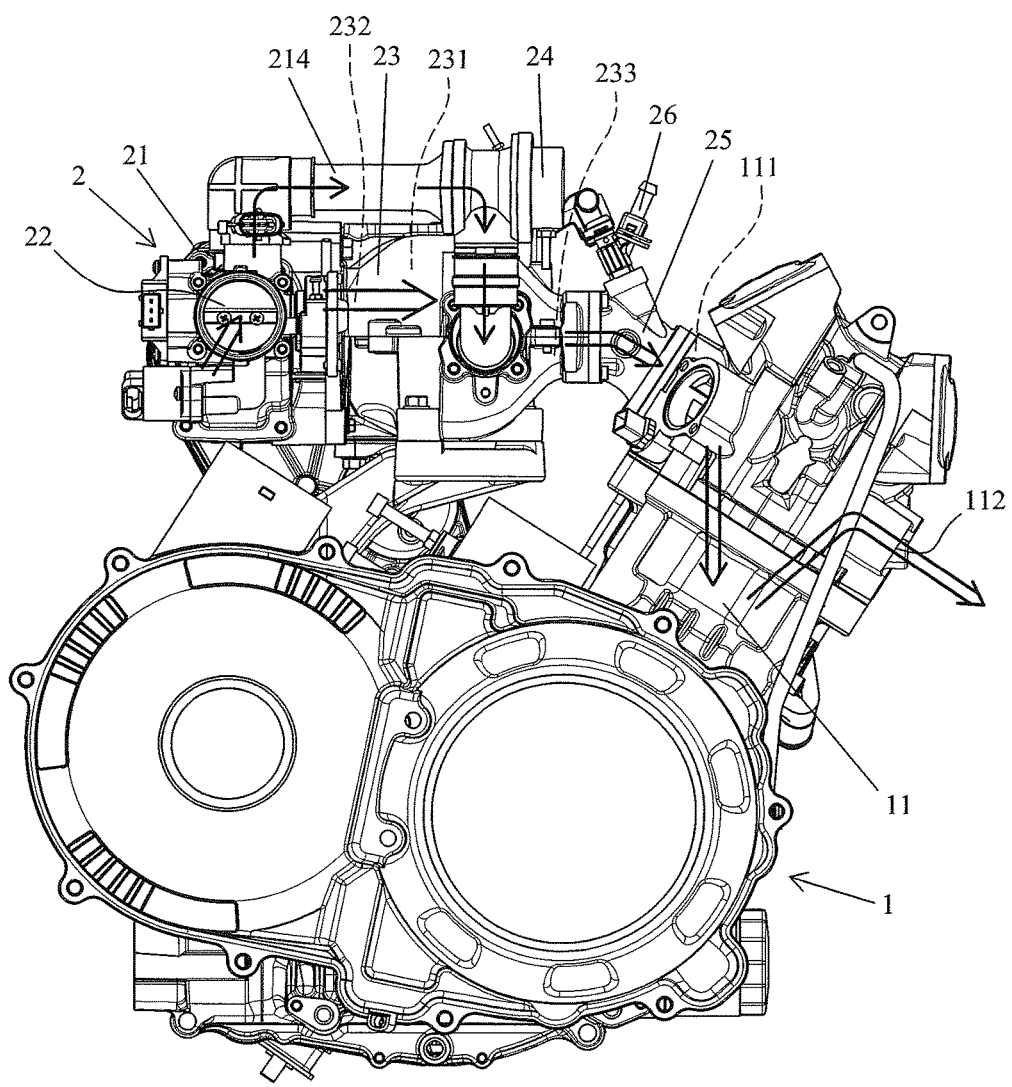
FIG. 4 is a diagrammatic side view illustrating the direction of supercharged intake and the return fuel or idle intake of the supercharger structure of FIG. 1.

With reference to FIGS. 1, 3, and 4, the double arrow indicates the direction of supercharged intake, and the single arrow indicates the direction of the return fuel or idle intake. Operation of the piston (not shown) in the engine body 1 actuates the crankshaft 12 and the supercharging device 2 to generate a pressure in the chamber 211 of the supercharger 21. When fuel is added, the control valve 24 is closed, and the external air passes through the throttle 22 and the inlet 212 into the chamber 211 and is pressurized. The pressurized air passes through the air accumulator 23 into the intake manifold 25 to mix with fuel ejected by the two nozzles 26 and then enters the cylinder 11. The air accumulator 23 provides accumulation of pressure and buffering between the supercharger 21 and the cylinder 11. Thus, air can be controlled to enter the intake manifold 25 and the cylinder 11. The waste gas after combustion in the cylinder 11 can be discharged through the outtake passage 112. The two nozzles 26 can eject a greater amount of fuel in response to the pressurized air to increase the engine output efficiency.

During fuel return or idling of the engine, the throttle 22 can be adjusted to allow a small amount of external air to enter the supercharger 21. In this case, the supercharger 21 creates a negative pressure, and the control valve 24 is opened. Furthermore, the duct 214 forms a bypass passage communicating the inlet 212 of the supercharger 21, the air accumulator 23, and the outlet 213 of the supercharger 21. The pressure of the inlet 212 and the outlet 213 of the supercharger 21 can be balanced. During fuel return or idling of the engine, the supercharger 21 can operate in a force-saving manner while preventing adverse influence on the engine performances. Furthermore, the air can be guided from the air accumulator 23 into the intake manifold 25 and the cylinder 11 while permitting the air accumulator 23 to accumulate pressure for the purposes of returning fuel or idling.

When fuel is added again, the control valve 24 is closed, the throttle valve 22 is opened to provide a larger opening, and the pressure in the air accumulator 23 can be rapidly introduced into the cylinder 11 to improve the accelerating effect.

In view of the foregoing, the supercharger structure according to the present invention can significantly increase the engine efficiency of an all terrain vehicle or a utility vehicle while fulfilling the vehicle performance demands of the user. Furthermore, the air accumulator 23 and the bypass duct 214 can increase the stability and efficiency of adding fuel, returning fuel, or idling.

Although specific embodiments have been illustrated and described, numerous modifications and variations are still possible without departing from the scope of the invention. The scope of the invention is limited by the accompanying claims.

The invention claimed is:

1. A supercharger structure for an all terrain vehicle or a utility vehicle comprising:
    an engine body including a cylinder, wherein the cylinder has an intake passage and an outtake passage; and
    a supercharging device including a supercharger, a throttle, an intake manifold, and at least one nozzle, wherein the supercharger includes a chamber, wherein the chamber has an inlet and an outlet, wherein the inlet is coupled with the throttle, wherein the chamber is configured to receive a guiding device operably connected to the engine body, wherein the outlet is connected to the intake manifold, wherein the intake manifold and the at least one nozzle intercommunicate with the intake passage of the cylinder, wherein the at least one nozzle is adapted to be connected to a fuel supply pipe of a vehicle, wherein operation of the engine body actuates the guiding device to draw external air to flow through the throttle and the inlet into the chamber and is pressurized, and wherein the pressurized air flows through the intake manifold to mix with fuel ejected by the at least one nozzle and then enters the cylinder.

2. The supercharger structure for the all terrain vehicle or the utility vehicle as claimed in claim 1, wherein the supercharging device further includes an air accumulator mounted between the cylinder and the supercharger, wherein the air accumulator includes an air chamber having an input side and an output side, wherein the input side of the air chamber intercommunicates with the outlet of the supercharger, and wherein the output side of the air chamber intercommunicates with the air intake manifold and the intake passage of the cylinder.

3. The supercharger structure for the all terrain vehicle or the utility vehicle as claimed in claim 1, wherein the supercharging device further includes an air accumulator and a control valve, wherein the supercharger includes a duct at the inlet, wherein the duct is connected to the air accumulator, wherein the control valve is mounted to the duct, wherein the air accumulator is mounted between the cylinder and the supercharger, wherein the air accumulator includes an air chamber having an input side and an output side, wherein the input side of the air chamber intercommunicates with the outlet and the duct of the supercharger, and wherein the output side of the air chamber intercommunicates with the air intake manifold and the intake passage of the cylinder.

4. The supercharger structure for the all terrain vehicle or the utility vehicle as claimed in claim 1, wherein the engine body further includes a crankshaft configured to be operably connected to the guiding device of the supercharger.

5. The supercharger structure for the all terrain vehicle or the utility vehicle as claimed in claim 1, wherein the at least one nozzle includes two nozzles, and wherein the two nozzles eject fuel into the cylinder simultaneously.

6. The supercharger structure for the all terrain vehicle or the utility vehicle as claimed in claim 3, wherein the control valve is a vacuum valve.

\* \* \* \* \*